United States Patent
Yuri et al.

(10) Patent No.: US 7,663,256 B2
(45) Date of Patent: Feb. 16, 2010

(54) COGENERATION SYSTEM

(75) Inventors: Nobuyuki Yuri, Wako (JP); Tsutomu Wakitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/256,651

(22) Filed: Oct. 23, 2008

(65) Prior Publication Data

US 2009/0108588 A1  Apr. 30, 2009

(30) Foreign Application Priority Data

Oct. 25, 2007  (JP) ............................... 2007-278204

(51) Int. Cl.
*F01K 15/00* (2006.01)
*F01K 13/00* (2006.01)
*F01K 1/00* (2006.01)
*F02M 31/08* (2006.01)

(52) U.S. Cl. ............................... 290/2; 60/659; 60/645; 165/52; 123/41.01

(58) Field of Classification Search ................. 290/1 A, 290/2; 123/41.65, 198 E, 41.01; 60/659, 60/645; 165/52, 104.31
See application file for complete search history.

(56) References Cited

U.S. PATENT DOCUMENTS

| | | | | |
|---|---|---|---|---|
| 2,459,807 A | * | 1/1949 | Gavin et al. | 137/565.33 |
| 3,678,284 A | * | 7/1972 | Peters | 290/1 R |
| 5,234,319 A | * | 8/1993 | Wilder | 417/40 |
| 6,192,680 B1 | * | 2/2001 | Brugman et al. | 60/398 |
| 6,525,431 B1 | | 2/2003 | Clucas et al. | |
| 6,854,273 B1 | * | 2/2005 | Lasley et al. | 60/646 |
| 7,400,052 B1 | * | 7/2008 | Badger | 290/1 A |
| 2002/0047689 A1 | * | 4/2002 | Bessho et al. | 322/1 |
| 2005/0001566 A1 | * | 1/2005 | Bell | 318/16 |
| 2005/0191183 A1 | * | 9/2005 | Kawakami et al. | 417/34 |
| 2006/0163878 A1 | * | 7/2006 | Anzioso et al. | 290/2 |
| 2007/0296222 A1 | * | 12/2007 | Blackman | 290/1 A |
| 2008/0061158 A1 | * | 3/2008 | Nakagawa et al. | 237/12.1 |

FOREIGN PATENT DOCUMENTS

| | | |
|---|---|---|
| DE | 3912113 A1 | 12/1989 |
| DE | 102005024827 A1 | 11/2006 |
| GB | 2257245 A | 1/1993 |
| JP | 63052646 A * | 3/1988 |
| JP | 2006220066 A * | 8/2006 |
| JP | 2006-348948 A | 12/2006 |

OTHER PUBLICATIONS

JP 2006220066 A document. Machine translation of Japanese patent. 2006, pp. 1-10.*
European Search Report dated Feb. 3, 2009, issued in corresponding European Patent Application No. 08018602.6.

* cited by examiner

*Primary Examiner*—Julio Gonzalez
(74) *Attorney, Agent, or Firm*—Westerman, Hattori, Daniels & Adrian, LLP

(57) ABSTRACT

A cogeneration system is disclosed. The system has a cooling water circulation channel for returning cooling water of the engine to the engine after some of the cooling water has been removed. The cooling water circulation channel is provided with a cooling water pump for pressure-feeding the cooling water; electricity supplying means; and a control part for performing a control so that electrical energy is supplied from the electricity supplying means to a motor for driving the cooling water pump when a power outage signal is received.

5 Claims, 6 Drawing Sheets

FIG.4A (INVENTION)

_US 7,663,256 B2_

COGENERATION SYSTEM

FIELD OF THE INVENTION

The present invention relates to an improvement to a cogeneration system in which a generator driven by the operation of an engine is used to produce electrical energy, and cold water is turned into hot water using heat released by the engine.

BACKGROUND OF THE INVENTION

There are known cogeneration systems in which a generator driven by the operation of an engine is used to produce electrical energy, and an exhaust heat exchanger is used to turn cold water into hot water, as disclosed in Japanese Patent Application Laid-Open Publication No. 2006-348948 (JP 2006-348948 A).

A cogeneration system disclosed in JP 2006-348948 A is provided with an engine; a generator that generates electricity, the generator being driven by the operation of the engine; an exhaust heat exchanger for using exhaust heat released from the engine to heat cold water into hot water; a cooling water circulation channel, through which cooling water circulates, and which is disposed between the engine and the exhaust heat exchanger; a cooling water pump for circulating the cooling water, the pump being disposed along the cooling water circulation channel, and a three-way valve for directly returning cooling water from the engine when an air-warming operation is performed immediately after the engine starts.

During the air-warming operation performed immediately after an engine starts, the cooling-water pump is operated, and cooling water from the engine is returned directly to the engine without passing through the exhaust heat exchanger.

In a case where the electrical energy generated by the generator is to be used, the electrical energy will be supplied after the warm-up operation of the engine has been concluded; therefore, the cooling water pump cannot be started immediately after the engine has been started. For this reason, when the engine is operated in a power outage and the engine load increases immediately after the engine has started, a cooling water malfunction will occur from the temperature of the cooling water reaching or exceeding a predetermined value, and a risk of engine stoppage will be presented.

SUMMARY OF THE INVENTION

An object of the present invention is to provide a cogeneration system in which a cooling water malfunction does not occur immediately after an engine is started, and engine stoppage can be prevented.

According to a first aspect of the present invention, there is provided a cogeneration system, wherein the cogeneration system comprises: an engine; a generator for generating electrical energy, the generator being driven by the engine; a cooling water circulation channel for returning cooling water of the engine to the engine after some of the cooling water has been removed; and an exhaust heat exchanger for increasing the temperature of the cooling water using exhaust gas released by the engine as a heat source, the exhaust gas heat exchanger being disposed along the cooling water circulation channel; wherein the cooling water circulation channel is provided with a cooling water pump for pressure-feeding the cooling water; electricity supplying means for supplying electrical energy; and a control part for performing a control so that electrical energy is supplied from the electricity supplying means to a motor of the cooling water pump when a power outage signal is received.

Thus, after a power outage, the engine can be cooled at the same time the engine is started. A cooling water malfunction, in which the engine reaches a state of high load immediately after starting, and the temperature of the cooling water reaches or exceeds a predetermined value, is accordingly less likely to occur. Therefore, it is possible to avoid the engine being stopped as a result of a cooling water malfunction.

Preferably, an inverter unit for changing a rate at which the motor rotates is disposed in a system for supplying electricity from the electricity supplying means to the motor. As long as the rate at which the cooling water pump rotates can be changed, it is thus possible to set a flow of cooling water that is ideal for the temperature of the engine. Accordingly, the energy supplied by the battery will not be excessively consumed, and energy can be conserved.

Desirably, the inverter unit is provided with a first input terminal for inputting power from the electricity supplying means, a first output terminal for outputting power to the motor, a second input terminal for inputting power from the generator, and a second output terminal for outputting power to the exterior. When the inverter unit is provided for changing the voltage and frequency of the electrical energy generated by the generator and outputting the energy to the exterior, it is not necessary to provide a separate inverter unit for changing the rate at which the cooling water circulation pump rotates. Therefore, the facility cost can be decreased. Additionally, the number of components can be reduced.

In a preferred form, the electricity supplying means is preferably a battery provided for starting the engine, or a battery provided solely for starting the cooling water pump. As a result, the engine can be restarted using simple and inexpensive means.

The battery is preferably disposed in an engine accommodation part, in which the engine is stored, or a unit accommodation part that has the exhaust heat exchanger. Therefore, an existing battery can be used effectively.

BRIEF DESCRIPTION OF THE DRAWINGS

Certain preferred embodiments of the present invention will be described in detail below, by way of example only, with reference to the accompanying drawings, in which:

FIGS. 4A and 4B are flowcharts comparing the cooling pump system according to the first embodiment and a conventional cooling-water pump system from the time that a power outage signal is detected until the generator starts to produce an electrical output;

DETAILED DESCRIPTION OF THE PREFERRED EMBODIMENTS

Figure 1:
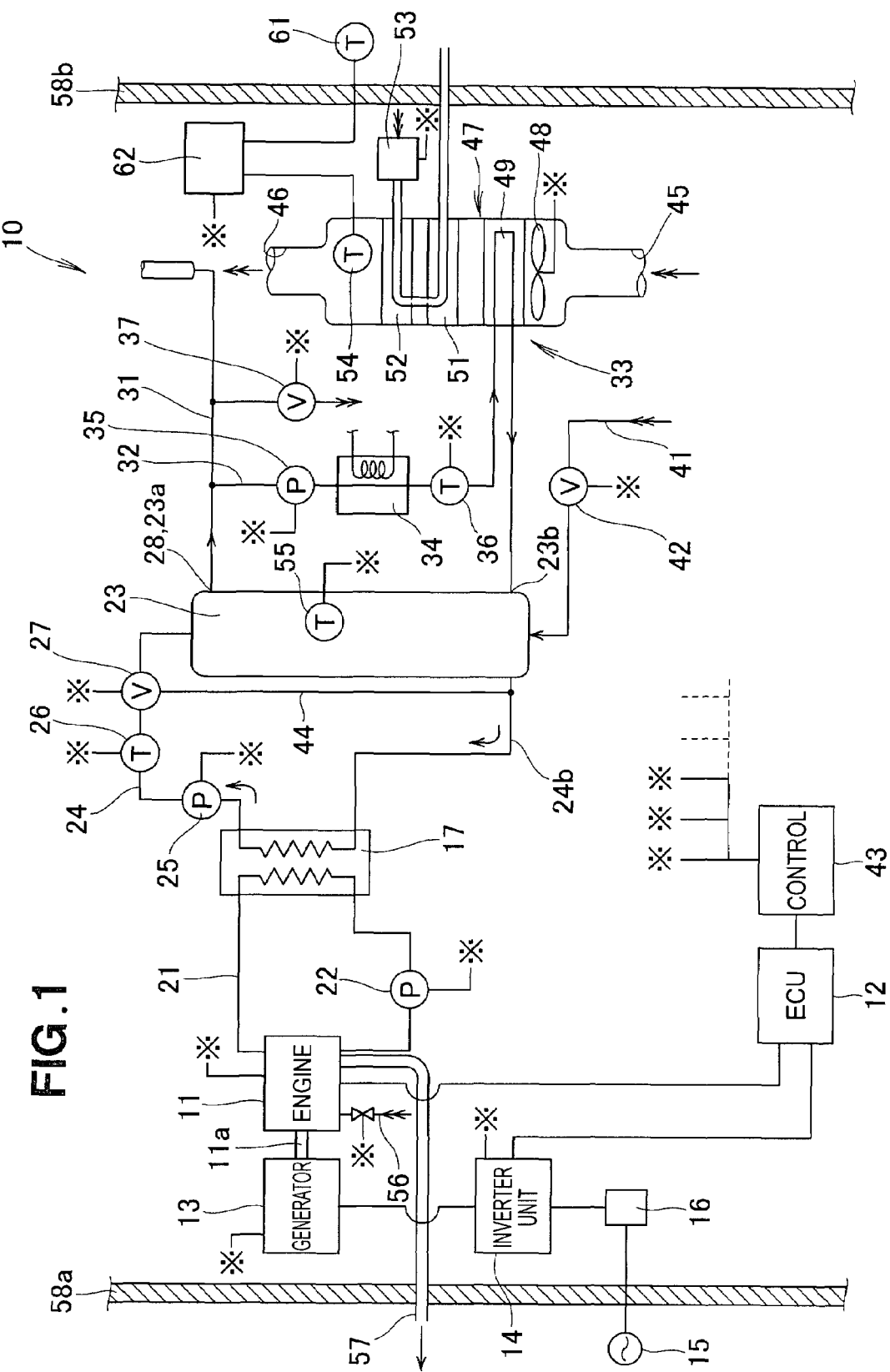
FIG. 1 is a block diagram showing a configuration of a cogeneration system according to the present invention.

As shown in FIG. 1, a cogeneration system 10 has an engine 11 used as a prime mover, an ECU 12 for controlling the engine 11, and a generator 13. The generator 13 is linked on an output shaft 11a of the engine 11, and electrical energy is generated by the drive of the engine 11.

An inverter unit 14 is connected to an output terminal of the generator 13. A changeover switch 16 is provided between the inverter unit 14 and an external commercial power supply 15, and stops the generated electrical energy from being supplied to the external commercial power supply 15 outside of predetermined periods.

An exhaust heat exchanger 17 increases the temperature of cooling water using exhaust gas released by the engine 11 as a heat source. A cooling water circulation channel 21 links the engine 11 and the exhaust heat exchanger 17, and cooling water for cooling the engine 11 is circulated therethrough. A cooling water circulation pump 22 is disposed along the cooling water circulation channel 21, and pumps cooling water heated by the exhaust heat exchanger 17 to the engine 11.

A hot water tank 23 stores hot water that has been subjected to heat exchange by the exhaust heat exchanger 17. A hot water circulation channel 24 links the exhaust heat exchanger 17 and the hot water tank 23, and is used to circulate hot water. A hot water pump 25, a temperature sensor 26, and a temperature adjustment valve 27 are disposed along the hot water circulation channel 24. A bypass path 44 connects a return pipe 24b for returning hot water from the hot water tank 23 to the exhaust heat exchanger 17, and the temperature adjustment valve 27. When the hot water in the hot water circulation channel 24 reaches a predetermined temperature according to the temperature sensor 26, e.g. 70° C., the temperature adjustment valve 27 is gradually opened, and the hot water starts to feed into an upper part of the hot water tank 23. The temperature adjustment valve 27 opens increasingly wider as the temperature of the water increases.

A hot water output pipe 31 is attached to a hot feedwater outlet 28 provided on the hot water tank 23, and hot water is pumped to the exterior via the output pipe 31.

A hot water circulation pipe 32 is used to return hot water output from the hot feedwater outlet 28 on one side 23a of the hot water tank 23 to the other side 23b of the hot water tank 23. A hot air heater 33 is disposed along the hot water circulation pipe 32.

Auxiliary heating means 34 is disposed along the hot water circulation pipe 32 upstream from the hot air heater 33, and is used to heat the hot water until a desired temperature is reached.

A hot water output pump 35 is provided in the hot water circulation pipe 32 between the hot feedwater outlet 28 of the hot water tank 23 and the auxiliary heating means 34. A temperature sensor 36 is provided in the hot water circulation pipe 32 upstream of the return outlet 23b of the hot water tank 23.

A drain valve 37 is linked to the hot feedwater outlet 28 via the hot water output pipe 31, and is opened to release hot water to an exterior.

Water is fed to the hot water tank 23 via a feedwater path 41. A feedwater valve 42 is disposed along the feedwater path 41, and is opened when necessary.

A control part 43 opens and closes the drain valve 37, and also controls a variety of other operations in the cogeneration system 10.

The hot air heater 33 is provided with a case 47 having an air inlet 45 and outlet 46, a blower 48 disposed in the case 47 and used for blowing air; a heat exchanger 49 provided downstream in the direction the air flows from the blower 48, and disposed along the hot water circulation pipe 32; a latent heat exchanger 51 and a sensible heat exchanger 52 that are disposed further downstream than the heat exchanger 49 in the direction of the flow of air from the blower 48; and a burner 53 for sending heated air to the sensible heat exchanger 52. Reference numeral 54 denotes a temperature sensor.

Combustion gas produced by the burner 53 passes through the sensible heat exchanger 52 and the latent heat exchanger 51 before being released to the outside. Air that has passed through the sensible heat exchanger 52 and the latent heat exchanger 51 gets heated by the blower 48 disposed in the case 47.

The burner 53 is activated when room temperature is substantially lower than a set value or when room temperature has not risen even after a predetermined period of time has elapsed.

A return pipe through which cold air returns from individual rooms is connected to the air inlet 45, and a delivery pipe for delivering hot air to the rooms is connected to the air outlet 46. In the drawing, reference numeral 55 designates a temperature sensor disposed in the hot water tank, reference numeral 56 designates a gas pipe for supplying gas to the engine 11, reference numeral 57 designates an exhaust pipe for discharging exhaust gases, and reference numerals 58a, 58b designate walls of a building. Assuming the inner side of the walls 58a, 58b is referred to as "inside", and the exterior side of the walls 58a, 58b constitutes the "outside", reference numeral 61 designates a temperature sensor disposed outside, and reference numeral 62 designates a remote control for setting an inside temperature.

Specifically, the hot water tank 23 for storing hot water, the temperature of which having been increased by heat released from the engine 11, is connected to the exhaust heat exchanger 17, which transmits heat released from the engine 11 to cold water and outputs hot water. The drain valve 37, which opens to release hot water to the exterior, is connected via the hot water output pipe 31 to the hot feedwater outlet 28 of the hot water tank 23, and when the hot water in the hot water tank 23 exceeds a predetermined temperature, the control part 43 performs a control to open the drain valve 37.

The ·✕· marks in the drawing indicate connections between the control part 43 and each of the devices.

The hot water circulation pipe 32 through which hot water from the hot water tank 23 is led to the exterior and returned is connected to the hot water tank 23, and the hot air heater 33, which warms external air using the hot water as a heat source is disposed along the hot water circulation pipe 32. The hot air heater 33 can thus be advantageously used. Therefore, the cogeneration system 10 can be used more effectively.

The auxiliary heating means 34 for keeping the hot water hot is provided in the hot water circulation pipe 32. Having the auxiliary heating means 34 provided upstream from the hot air heater 33 along the hot water circulation pipe 32 enables the hot water circulation pipe 32 to be heated even if the temperature of the hot water tank 23 is low, allowing the predetermined heating capability of the hot air heater 33 to be maintained.

Figure 2:
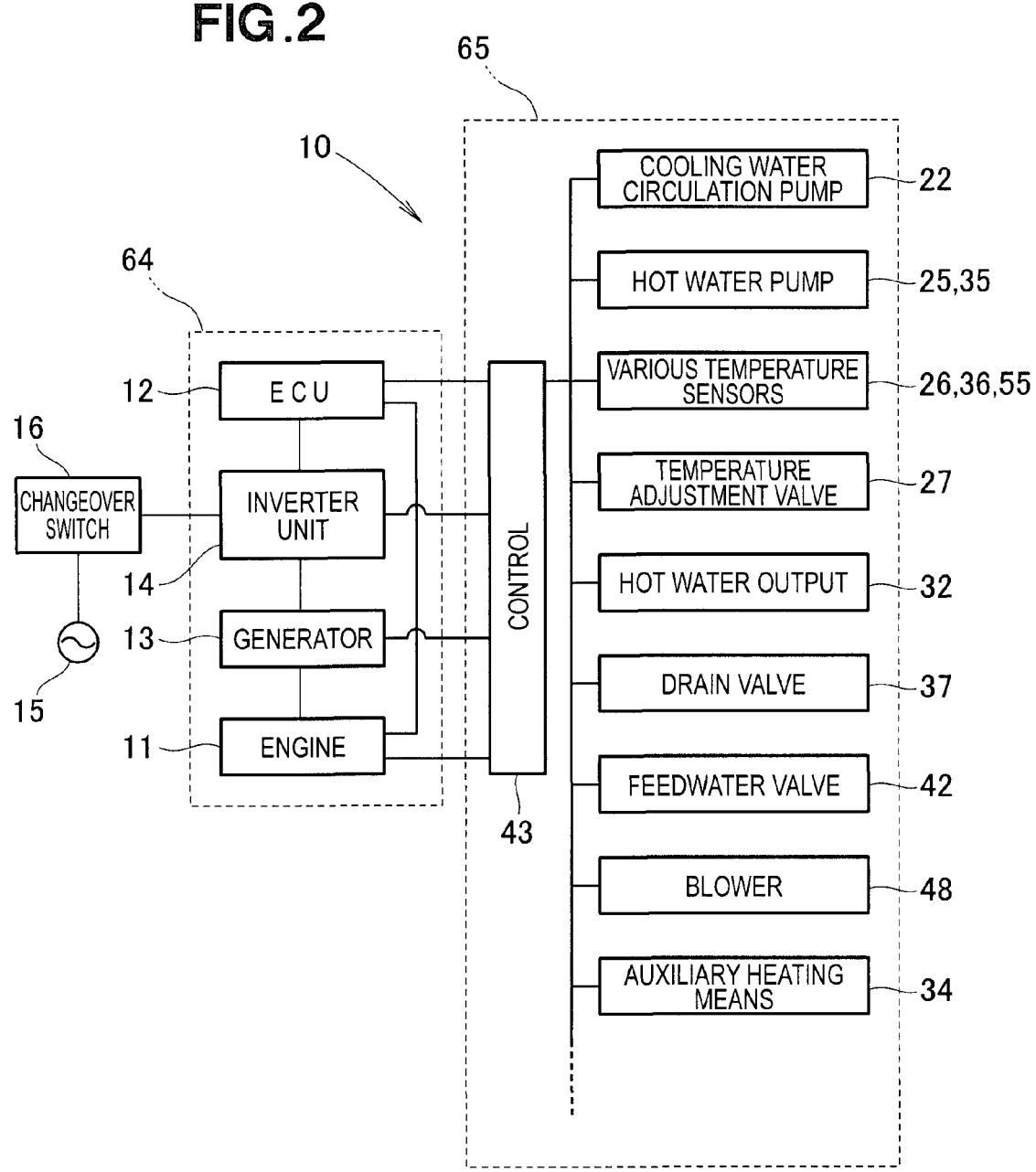
FIG. 2 is a block diagram showing a control performed in the cogeneration system of FIG. 1.

As shown in FIG. 2, the cogeneration system 10 according to the present embodiment comprises a power generating unit 64 and a hot feedwater unit 65.

The power generating unit 64 is provided with the engine 11; the generator 13 driven by the engine 11; and the inverter unit 14. The inverter unit 14, which is connected to an output terminal of the generator 13, converts the frequency and voltage of the generator 13 for output, and has a starter drive function for switching the generator 13 to function as a starter. An output of the inverter unit 14 is connected to the external commercial power supply 15. When the engine reaches a predetermined state, and the generated energy has reached a predetermined value, the output is connected to the changeover switch 16 (FIG. 1), and electrical energy is supplied to the external commercial power supply 15.

The hot feedwater unit 65 includes the control part 43. The cooling water circulation pump 22; the hot water pump 25; the various temperature sensors 26, 36, 55; the temperature adjustment valve 27; the hot water output pump 35; the drain valve 37; the feedwater valve 42; the blower 48; and the auxiliary heating means 34 are connected to the control part 43.

The control part 43 is connected to an ECU 12, and to each of the pumps, valves, and temperature sensors that are disposed in the system (shown by the ⨯ mark in the drawing); and performs a variety of controls over each of the pumps and valves.

Figure 3:
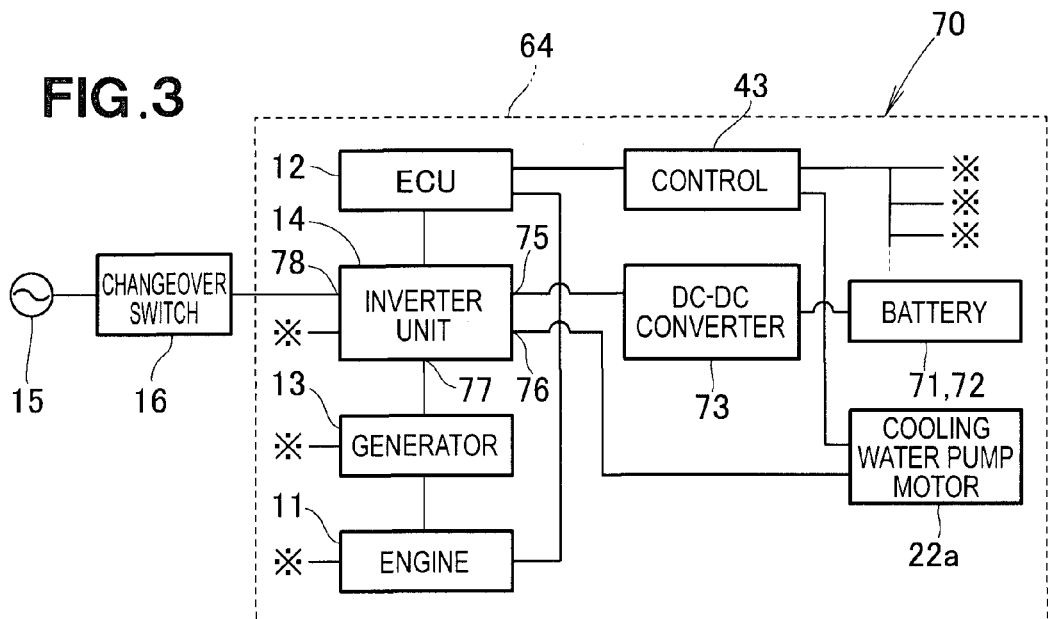
FIG. 3 is a block diagram showing a cooling pump system according to a first embodiment of the present invention.
Figure 3:
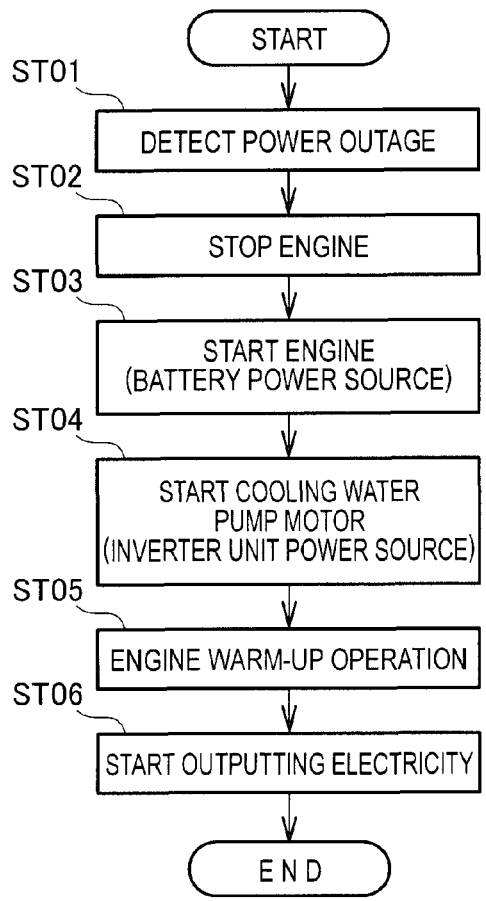

FIG. 3 shows a cooling pump system of the first embodiment. A description shall now be provided with reference to FIG. 1.

A cooling pump system 70 in the first embodiment is provided with the cooling water pump 22 for pressure-feeding the cooling water, the pump 22 being disposed along the cooling water circulation channel 21; a battery 72 used as electricity supplying means 71 for supplying electrical energy; and a control part 43 for performing a control to supply electrical energy to a motor 22a of the cooling water pump 22 using the battery 72 when a power outage signal is received. Since the battery 72 is provided in the power generating unit 64, which is used as an engine accommodating part, an existing battery can be used effectively.

The inverter unit 14, which changes the rate at which the motor 22a rotates, is disposed in a system for feeding electricity from the electricity supplying means 71 to the motor 22a; and a DC-DC converter 73 is disposed between the battery 72 and the inverter unit 14.

As long as the rate at which the cooling water pump 22 rotates can be changed, it is possible for the cooling water to be set to flow in an amount that is ideal for the temperature of the engine 11. Accordingly, the energy supplied by the battery 12 will not be excessively consumed, and energy can be conserved.

The inverter unit 14 is provided with a first input terminal 75 for receiving electricity fed from the battery 72, a first output terminal 76 for outputting electricity to the motor 22a, a second input terminal 77 for receiving electricity fed from the generator 13, and a second output terminal 78 for outputting electricity to the changeover switch 16 used to gain access the exterior.

In a case where the inverter unit 14 for changing the voltage and frequency of the electrical energy generated by the generator 13 and outputting the energy to the exterior is provided, the first input terminal 75 and the first output terminal 76 will be provided in the inverter unit 14; therefore, it is not necessary to separately provide an inverter unit for changing the rate at which the cooling water pump 22 rotates. Specifically, the inverter unit 14 can be compiled into one unit, allowing the facility cost to be reduced. Additionally, the number of components can be reduced.

Figure 4B:
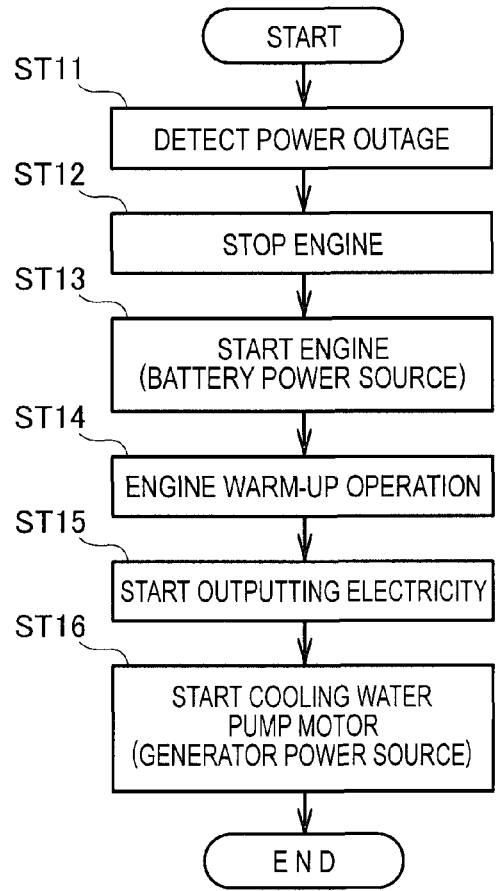

FIGS. 4A and 4B show a comparison between the cooling water pump system of the first embodiment and a conventional embodiment when a power outage signal is received.

As shown in FIG. 4A, when a power outage occurs in the external commercial power supply 15 in Step ("ST" hereunder) 01, an ignition system of the engine 11 stops and the engine 11 stops (ST02). The connection between the external commercial electrical source 15 and the inverter unit 14 is then turned off by the changeover switch 16.

In ST03, the battery power source provided in the engine 11 is used to cause the engine 11 to start autonomously. The motor 22a of the cooling water pump 22 is driven using the battery 72 via the inverter unit 14 (ST04).

The engine 11 is caused to warm-up in ST05, and once the engine 11 has reached a predetermined state, the changeover switch 16 is set to ON, and electricity starts to be outputted (ST06).

Thus ends the flow of steps in the cooling pump system of the first embodiment from when the power outage signal is detected to when electricity starts to be outputted by the generator.

In FIG. 4B, when a power outage occurs in ST11, the engine 11 stops (ST12). The connection between the external commercial electrical source 15 and the inverter unit 14 is then turned off by the changeover switch 16.

In ST13, the battery power supply of the engine 11 is used to cause the engine 11 to start autonomously.

The engine 11 is caused to warm-up in ST14, and once the engine 11 has reached a predetermined state, the changeover switch 16 is set to ON, and electricity starts to be outputted (ST15).

Thereafter, in ST16, the motor of the cooling water pump 22 is driven by the power of the generator.

Thus ends the flow of steps in the cooling pump system of the prior art from when the power outage signal is detected to when electricity starts to be outputted by the generator.

The cooling pump system 70 of the first embodiment is provided with the battery 72 used as electricity supplying means 71, and the control part 43 for performing a control so that electrical energy will be supplied to the motor 22a of the cooling water pump 22 using the battery 72 when a power outage signal is received. Therefore, after a power outage occurs, it is thus possible to cool the engine 11 at the same time that the engine 11 is started. Accordingly, a cooling water malfunction, in which the engine 11 reaches a state of high load immediately after starting, and the temperature of the cooling water reaches or exceeds a predetermined value, is less likely to occur. Therefore, it is possible to avoid stoppage of the engine 11 due to a cooling water malfunction.

Figure 5:
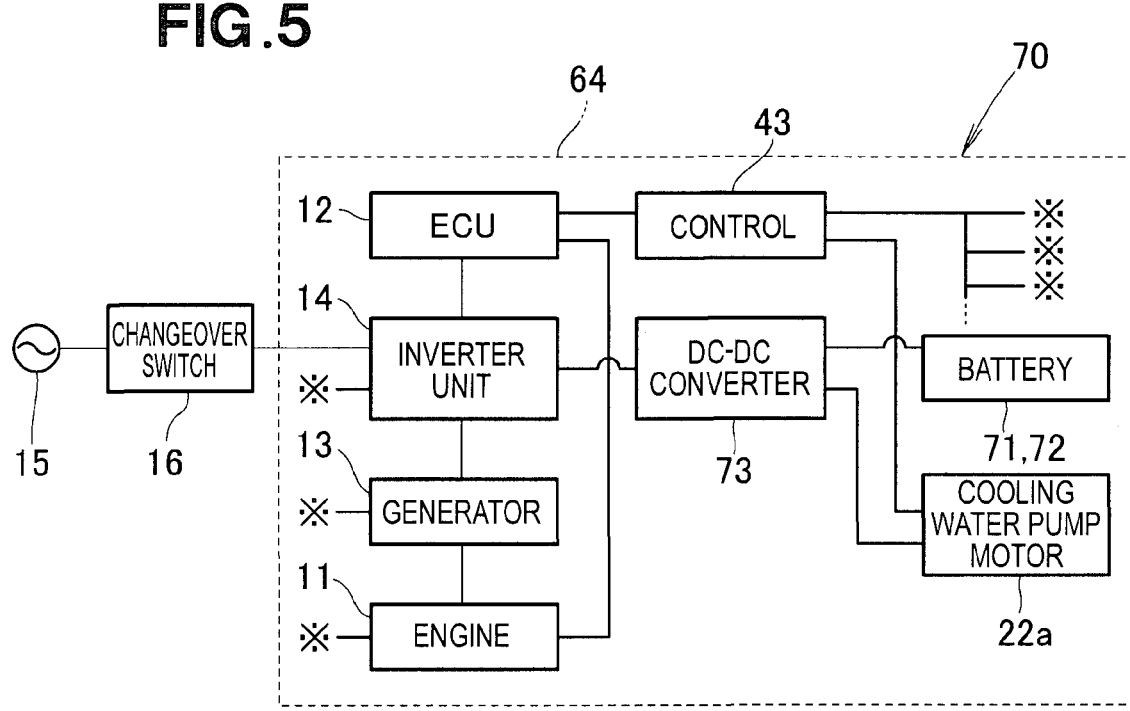
FIG. 5 is a block diagram showing a cooling-water pump system according to a second embodiment.

FIG. 5 shows a cooling pump system 70 of a second embodiment. The cooling pump system 70 of the first embodiment shown in FIG. 3 differs from that of the second embodiment in that the motor 22a of the cooling water pump 22 is connected to the DC-DC converter 73, and a DC motor is used. There are no other major differences between the systems.

A cooling pump system thus configured allows power to be supplied to the motor 22a simultaneously with the starting of the engine 11, and a separate system to be controlled independently of the starting of the engine 11.

Figure 6:
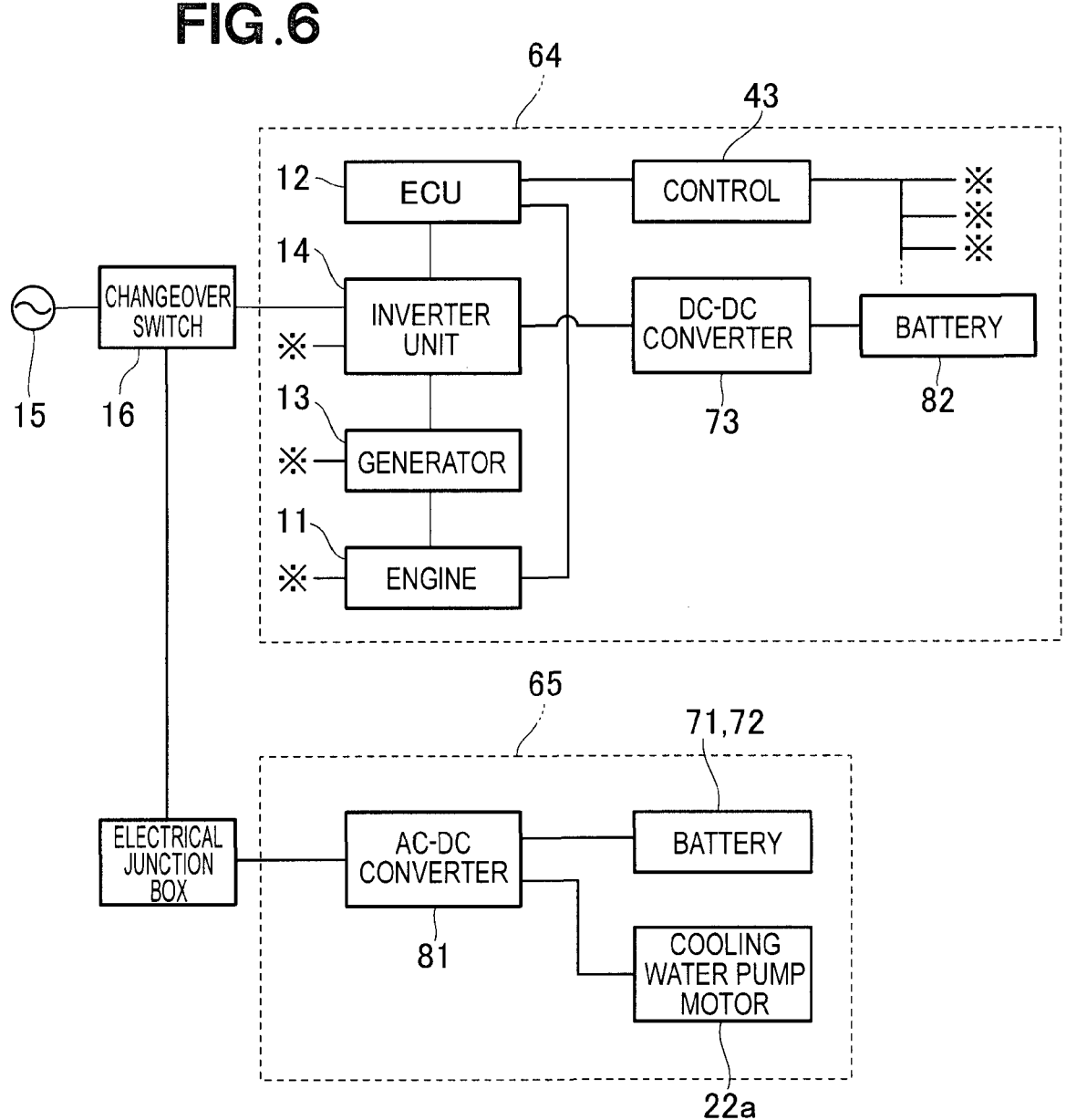
FIG. 6 is a block diagram showing a cooling pump system according to a third embodiment.

FIG. 6 shows a cooling pump system of a third embodiment. The cooling pump system of the third embodiment and the cooling pump system of the first embodiment shown in FIG. 3 differ in that the motor 22a of the cooling water circulation pump 22 and the battery 72 used as the electricity supplying means 71 for supplying a power source to the motor 22a are disposed in the hot feedwater unit 65. There are no other major differences between the systems.

Reference numeral 81 designates an AC-DC converter, and reference numeral 82 designates a battery. Since the battery 72 is disposed in the hot feedwater unit 65 used as a unit accommodation part, within which the exhaust heat exchanger 17 is included, the existing battery 82 can be used effectively.

Figure 7:
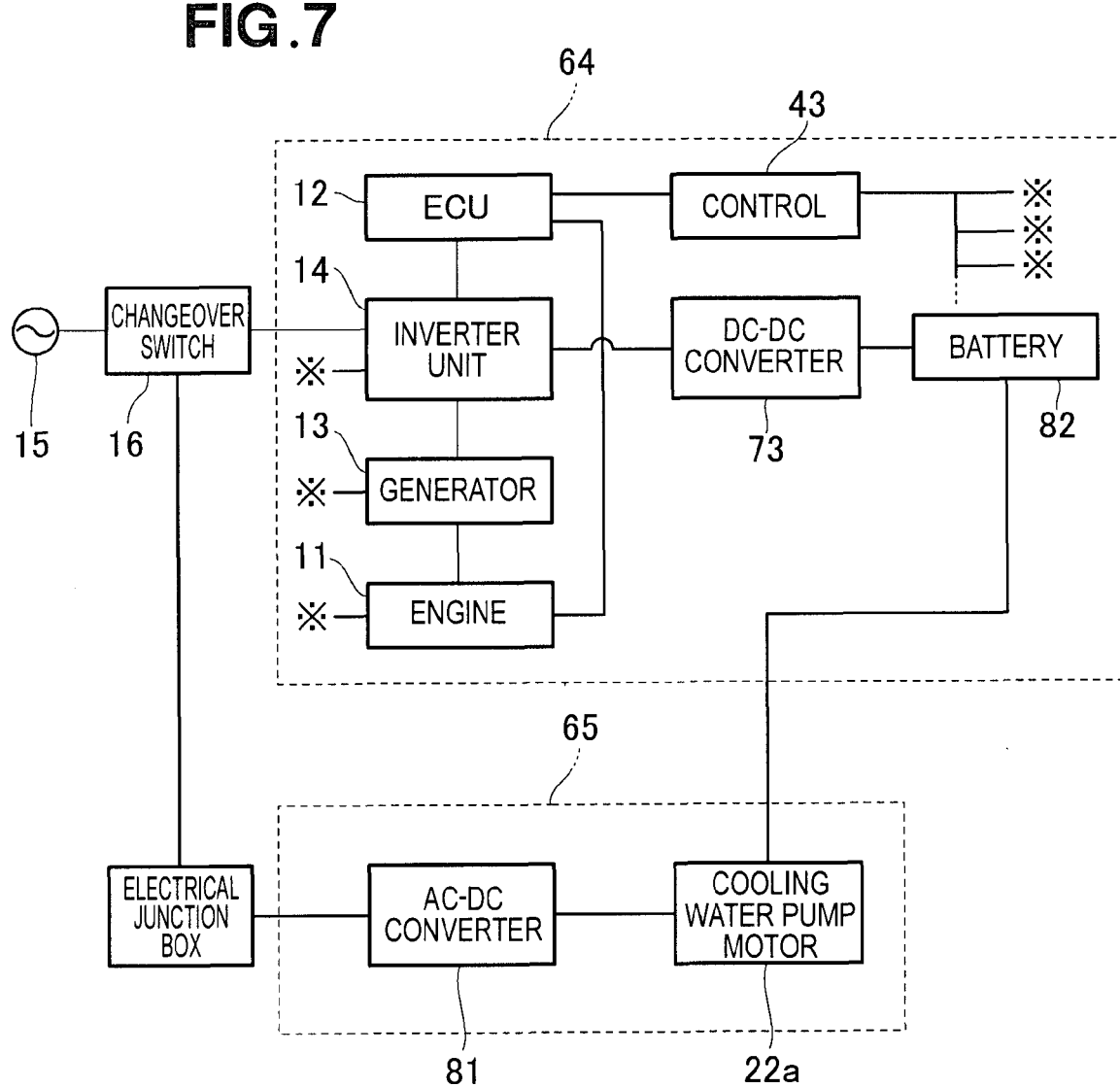
FIG. 7 is a block diagram showing a modification of the cooling water pump according to the third embodiment shown in FIG. 6.

FIG. 7 shows a modification of the third embodiment shown in FIG. 6, which differs from the third embodiment shown in FIG. 6 in that the battery 82 disposed in the power generating unit 64 is connected to the motor 22a, and is used as power source supplying means for starting the motor 22a in the event of a power outage. There are no other major differences between the systems.

In the present invention, the inverter unit disposed between the electricity supplying means and the motor of the cooling water pump need not be provided.

Obviously, various minor changes and modifications of the present invention are possible in light of the above teaching. It is therefore to be understood that within the scope of the appended claims the invention may be practiced otherwise than as specifically described.

What is claimed is:

1. A cogeneration system comprising:
   an engine;
   a generator designed to be driven by the engine for generating electrical energy;
   a cooling water circulation channel for returning cooling water of the engine to the engine after some of the cooling water has been removed; and
   an exhaust heat exchanger disposed on the cooling water circulation channel for increasing a temperature of the cooling water using exhaust gas released by the engine as a heat source,
   wherein the cooling water circulation channel comprises a cooling water pump for directly pressure-feeding the cooling water from the exhaust heat exchanger to the engine; electricity supplying means for supplying electrical energy; and a control part for performing a control so that electrical energy is supplied from the electricity supplying means to a motor of the cooling water pump when a power outage signal is received.

2. The cogeneration system of claim 1, wherein an inverter unit for changing a rate at which the motor rotates is disposed in a system for supplying electricity from the electricity supplying means to the motor.

3. The cogeneration system of claim 2, wherein the inverter unit comprises a first input terminal for inputting power from the electricity supplying means, a first output terminal for outputting power to the motor, a second input terminal for inputting power from the generator, and a second output terminal for outputting power to the exterior.

4. The cogeneration system of claim 1, wherein the electricity supplying means comprises one of a battery provided for starting the engine and a battery provided solely for starting the cooling water pump.

5. The cogeneration system of claim 4, wherein the battery is disposed in an engine accommodation part in which the engine is stored, or a unit accommodation part that has the exhaust heat exchanger.

* * * * *